UNITED STATES PATENT OFFICE.

JAMES EDWIN SUMMERS, OF LYNCHBURG, VIRGINIA, ASSIGNOR TO THE SUMMERS MARBLE COMPANY, OF SAME PLACE.

MANUFACTURE OF ARTIFICIAL MARBLE.

SPECIFICATION forming part of Letters Patent No. 635,005, dated October 17, 1899.

Application filed January 17, 1899. Serial No. 702,399. (No specimens.)

*To all whom it may concern:*

Be it known that I, JAMES EDWIN SUMMERS, of Lynchburg, in the county of Campbell and State of Virginia, have invented certain new and useful Improvements in the Manufacture of Artificial Marble, of which the following is a full, clear, and exact description.

The object of the invention is to provide certain new and useful improvements in the manufacture of artificial marble whereby the expensive mode now practiced for polishing and graining the marble is entirely dispensed with and at the same time a close imitation, both as to structure and appearance, of the natural polished marble is obtained at a comparatively low cost.

The invention consists of novel features and parts and combinations of the same, as will be fully described hereinafter and then pointed out in the claims.

In order to carry the invention into effect, I proceed as follows: A quantity of lime-water is placed in a suitable box or vat. Then about fifteen drops of silicate of soda are added to every pint of lime-water and thoroughly mixed therewith by stirring or otherwise agitating the lime-water, and then Parian or similar cement is slowly and gradually added to the mixture contained in the box or vat, so that the cement readily absorbs all the lime-water and silicate of soda contained therein. The mixture is now left to stand for a few minutes, then the mass is stirred thoroughly, and then various pigments are added, each pigment being, however, previously mixed with some dry cement of the same kind and quality originally used to absorb the lime-water. These pigments are dropped into the box containing the mixture, and then said mixture is agitated by a few strokes with a suitable tool to give it a variegated appearance by distributing the pigments in the mass. The mass is now poured into a mold made of glass or other suitable material, having an exceedingly smooth inner surface. The mass is now left to dry and harden in the mold, this process taking about from three to four hours, and then the article is removed from the mold and is rubbed off with linseed-oil and a soft cloth, the oil serving to preserve the polish and to keep the colors from fading. In the article produced the colors are properly blended to give the article the appearance of colored natural marble, and at the same time the contact of the plastic mass with the smooth inner surfaces of the mold will give the artificial marble a polished face without further grinding or polishing, as was heretofore practiced in the production of artificial marble. I prefer to use mineral colors.

Having thus fully described my invention, I claim as new and desire to secure by Letters Patent—

1. The herein-described method of manufacturing artificial marble, which consists in mixing together lime-water and silicate of soda, adding a cement to said mixture until it is fully incorporated therewith and finally allowing the mass to harden on a highly-polished surface, all substantially as set forth.

2. The herein-described method of manufacturing artificial marble which consists in mixing together lime-water and silicate of soda, then adding a cement until the mixture becomes incorporated therewith, adding a pigment previously mixed with such cement to the said mass, and finally allowing the mass to harden on a highly-polished surface, as set forth.

3. The herein-described method of manufacturing artificial marble which consists in mixing together lime-water and silicate of soda in the proportion of about fifteen drops of the latter to every pint of the former, adding cement to said mixture until it has become fully incorporated therewith, then adding to the mass a pigment previously mixed with dry cement of the same kind and quality as that first named, and finally allowing the mass to harden on an exceedingly smooth or polished surface, all substantially as set forth.

JAMES EDWIN SUMMERS.

Witnesses:
J. M. B. LEWIS,
H. M. SACKETT.